(12) United States Patent
Qiao (10) Patent No.: US 7,158,245 B2
(45) Date of Patent: Jan. 2, 2007

(54) PRINTER AND POWER SAVE CONTROL METHOD FOR THE SAME

(75) Inventor: Jingyu Qiao, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 816 days.

(21) Appl. No.: 09/866,658

(22) Filed: May 30, 2001

(65) Prior Publication Data

US 2002/0097423 A1    Jul. 25, 2002

(30) Foreign Application Priority Data

Jan. 25, 2001    (JP) .............................. 2001-017427

(51) Int. Cl.
*G06F 15/00* (2006.01)

(52) U.S. Cl. .................. 358/1.14; 358/1.15; 399/43; 399/70; 399/88; 399/89; 713/320; 713/321

(58) Field of Classification Search .............. 358/1.14; 713/320–321; 399/43, 70, 88–89
See application file for complete search history.

(56) References Cited

U.S. PATENT DOCUMENTS

| | | | | |
|---|---|---|---|---|
| 5,557,748 | A * | 9/1996 | Norris | 709/220 |
| 5,841,981 | A * | 11/1998 | Kondo | 709/223 |
| 5,900,026 | A * | 5/1999 | Ryu | 713/320 |
| 5,905,900 | A * | 5/1999 | Combs et al. | 713/320 |
| 5,933,581 | A * | 8/1999 | Miyazaki et al. | 358/1.14 |
| 5,937,148 | A * | 8/1999 | Okazawa | 358/1.13 |
| 6,081,663 | A * | 6/2000 | Takahashi et al. | 703/20 |
| 6,268,925 | B1 * | 7/2001 | Yamanaka | 358/1.14 |
| 6,408,395 | B1 * | 6/2002 | Sugahara et al. | 713/310 |
| 6,459,496 | B1 * | 10/2002 | Okazawa | 358/1.14 |
| 6,493,100 | B1 * | 12/2002 | Endo et al. | 358/1.14 |
| 6,594,767 | B1 * | 7/2003 | Wiley et al. | 713/300 |
| 2003/0103656 | A1 * | 6/2003 | Lapstun et al. | 382/119 |
| 2003/0233274 | A1 * | 12/2003 | Urken et al. | 705/12 |
| 2005/0149364 | A1 * | 7/2005 | Ombrellaro | 705/3 |

FOREIGN PATENT DOCUMENTS

| | | |
|---|---|---|
| JP | 7-271538 | 10/1995 |
| JP | 8-185283 | 7/1996 |
| JP | 11-5350 | 1/1999 |
| JP | 11-167473 | 6/1999 |
| JP | 11-316517 | 11/1999 |
| JP | 2000-137550 | 5/2000 |

* cited by examiner

*Primary Examiner*—Joseph R. Pokrzywa
*Assistant Examiner*—Mark R. Milia
(74) *Attorney, Agent, or Firm*—Westerman, Hattori, Daniels & Adrian, LLP.

(57) ABSTRACT

Disclosed is a printer which performs efficient power save control by keeping track of the condition of each client of the printer without having to send wasteful packets, that is, without affecting the network environment. The printer includes: a unit for monitoring packets flowing on a network, and for updating and storing a client-associated last receive time each time a packet is received from any client of the printer; a unit for determining, by referring to the stored client-associated last receive time, that any client from whose associated last receive time has elapsed a prescribed time is in an idle condition, and for computing a printer usage rate by summing the past average usage rates of the clients that have been determined not to be in an idle condition; and a unit for setting, based on the computed printer usage rate, the length of time allowed before a transition is made to the power save mode.

10 Claims, 14 Drawing Sheets

Example Internet Datagram Header (From RFC791)

Packet 1: 00:80:17:88:2C:B6 -> broadcast
    Network: Ethernet
    Frame type: 802.3, Frame size: 60
    Time: 18h:17m 17.505sec
ARP    REQUEST
    Hardware Type: [1] ETHERNET,   Protocol type: [0800]  IP
    Source host:      172.22.33.48                                  <- CL1
    Destination host: 172.22.33.55
    Source Hardware address:       00:80:17:88:2C:B6
    Destination Hardware address:  broadcast
------------------------------------------------------------
------------------------------------------------------------

Packet 2: 00:90:27:08:20:B2 -> broadcast
    Network: Ethernet
    Frame type: 802.3, Frame size: 60
    Time: 18h:21m 19.999sec
ARP    REQUEST
    Hardware Type: [1] ETHERNET,   Protocol type: [0800]  IP
    Source host:      172.22.33.100                                 <- CL2
    Destination host: 172.22.33.104
    Source Hardware address:       00:90:27:08:20:B2
    Destination Hardware address:  00:00:00:00:00:00
------------------------------------------------------------
------------------------------------------------------------

Packet 3: 00:A0:C9:6F:5E:2B -> broadcast
    Network: Ethernet
    Frame type: 802.3, Frame size: 60
    Time: 18h:23m 24.797sec
ARP    REQUEST
    Hardware Type: [1] ETHERNET,   Protocol type: [0800]  IP
    Source host:      172.22.33.121                                 <- CL3
    Destination host: 172.22.33.24
    Source Hardware address:       00:A0:C9:6F:5E:2B
    Destination Hardware address:  00:00:00:00:00:00
------------------------------------------------------------
------------------------------------------------------------

Packet 4: 00:00:0E:6E:04:50 -> broadcast
    Network: Ethernet
    Frame type: 802.3, Frame size: 60
    Time: 18h:29m 25.327sec
ARP    REQUEST
    Hardware Type: [1] ETHERNET,   Protocol type: [0800]  IP
    Source host:      172.22.33.1                                   <- SV1
    Destination host: 172.22.33.41
    Source Hardware address:       00:00:0E:6E:04:50
    Destination Hardware address:  00:00:00:00:00:00

Fig.10

Packet 5:   00:A0:C9:6F:5E:2B -> broadcast
    Network:   Ethernet
    Frame type:   802.3,   Frame size:   60
    Time:   18h:29m 28.960sec
ARP    REQUEST
    Hardware Type: [1] ETHERNET,   Protocol type: [0800]   IP
    Source host:   172.22.33.121   <- CL3
    Destination host:   172.22.33.27
    Source Hardware address:   00:A0:C9:6F:5E:2B
    Destination Hardware address:   00:00:00:00:00:00

--------------------------------------------------------
--------------------------------------------------------

Packet 6:   00:00:0E:6E:04:50 -> broadcast
    Network:   Ethernet
    Frame type:   802.3,   Frame size:   60
    Time:   18h:33m 30.292sec
ARP    REQUEST
    Hardware Type: [1] ETHERNET,   Protocol type: [0800]   IP
    Source host:   172.22.33.1   <- SV1
    Destination host:   172.22.33.41
    Source Hardware address:   00:00:0E:6E:04:50
    Destination Hardware address:   00:00:00:00:00:00

--------------------------------------------------------
--------------------------------------------------------

Packet 7:   00:80:17:88:2C:B6 -> broadcast
    Network:   Ethernet
    Frame type:   802.3,   Frame size:   60
    Time:   18h:34m 40.689sec
ARP    REQUEST
    Hardware Type: [1] ETHERNET,   Protocol type: [0800]   IP
    Source host:   172.22.33.48   <- CL1
    Destination host:   172.22.33.55
    Source Hardware address:   00:80:17:88:2C:B6
    Destination Hardware address:   broadcast --------------------------------------------------------
--------------------------------------------------------

Packet 8:   00:80:17:88:2C:B6 -> broadcast
    Network:   Ethernet
    Frame type:   802.3,   Frame size:   60
    Time:   18h:36m 43.510sec
ARP    REQUEST
    Hardware Type: [1] ETHERNET,   Protocol type: [0800]   IP
    Source host:   172.22.33.48   <- CL1
    Destination host:   172.22.33.55
    Source Hardware address:   00:80:17:88:2C:B6
    Destination Hardware address:   broadcast

Fig.11

| CLIENT (ADDRESS) | LAST RECEIVE TIME |
|---|---|
| CL1 (172.22.33.48) | 18h: 36m 43.510sec |
| CL2 (172.22.33.100) | 18h: 21m 19.999sec |
| CL3 (172.22.33.121) | 18h: 29m 28.960sec |
| CL4 (172.22.33.71) | 17h: 29m 28.324sec |

| CLIENT | CONDITION (○···WORKING, ×···IDLE) |
|---|---|
| CL1 | ○ |
| CL2 | ○ |
| CL3 | ○ |
| CL4 | × |
| CL5 | × |
| CL6 | × |
| SV1 | ○ |

Fig.14

| CLIENT | AVERAGE USAGE RATE | |
|---|---|---|
| | PR1 | PR2 |
| CL1 | 10 | 0 |
| CL2 | 35 | 0 |
| CL3 | 40 | 0 |
| CL4 | 10 | 20 |
| CL5 | 0 | 25 |
| CL6 | 0 | 20 |
| SV1 | 0 | 0 |

UNIT (PAGES/HOUR)

Fig.15

| PRINTER USAGE RATE X | POWER SAVE INTERVAL |
|---|---|
| X > 90 | CONSTANT STANDBY |
| 90 >= X > 50 | 120min |
| 50 >= X > 10 | 60min |
| 10 >= X | 30min |
| X = 0 | 0min (IMMEDIATELY GOES INTO POWER SAVE MODE) |

PRINTER AND POWER SAVE CONTROL METHOD FOR THE SAME

BACKGROUND OF THE INVENTION

1. Field of the Invention

The present invention relates to a printer that supports a power save mode and that performs printing by accepting a print request from a client via a network. The invention also relates to a power save control method for the same.

2. Description of the Related Art

Figure 1:
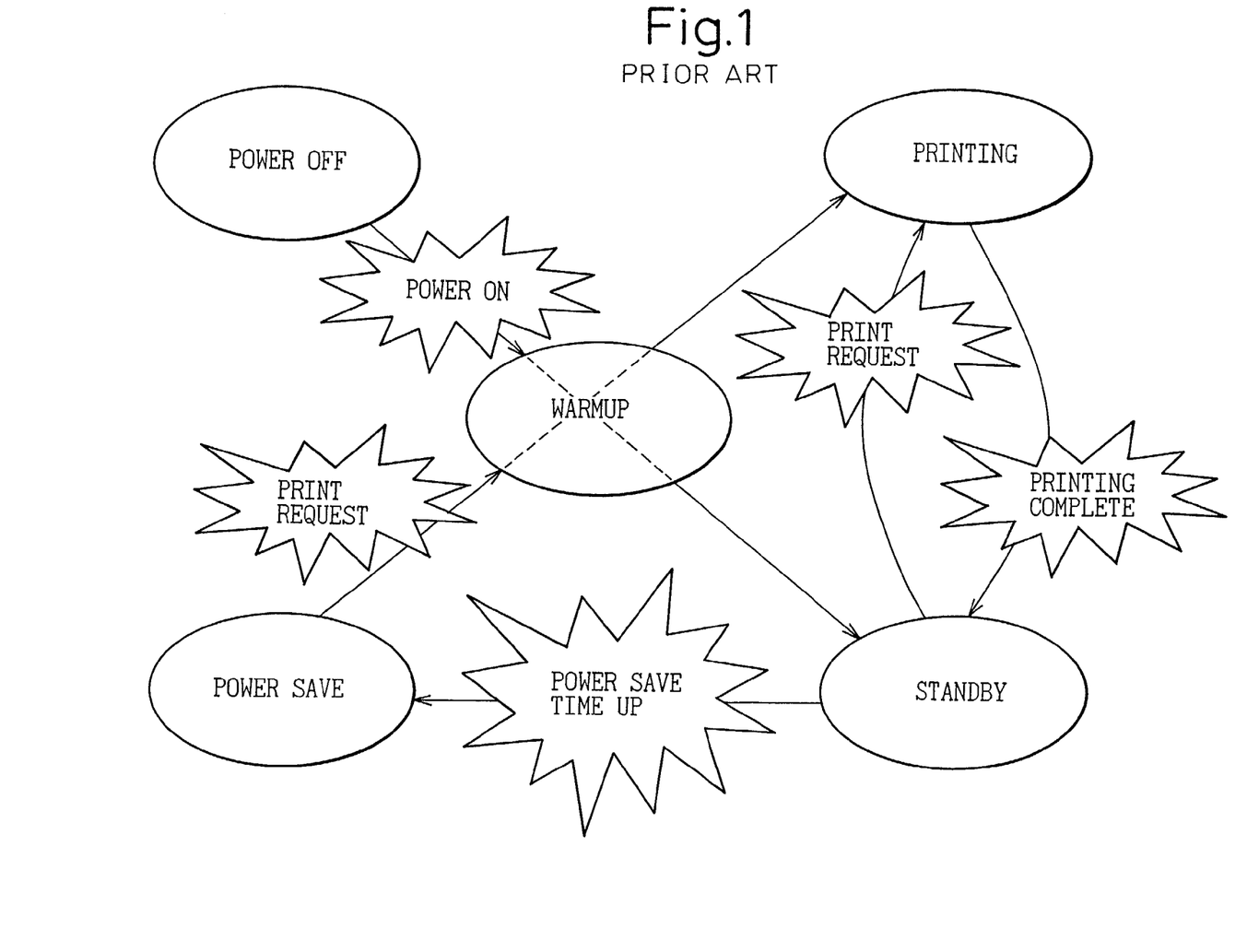
FIG. 1 is a basic state transition diagram for a printer.

Generally, printers support a power save mode to save energy, and go into the power save mode when a prescribed condition occurs. Transitions between the power save mode and other modes are illustrated in FIG. 1. In the figure, standby mode is a state in which the printer is ready to print upon accepting a print request. On the other hand, the power save mode is a state in which the printer is put in an energy saving state; in this state, the printer can accept a print request, but cannot start printing at once because the process section, containing the paper transport unit, photoconductor, developing unit, charge unit, and transfer unit, as well as the fusing unit, is powered off and it takes time for the fusing unit, cooled down to normal temperature, to be heated up to its operating temperature. A warmup mode is a state in which the printer is performing initialization for printing such as preheating the fusing unit.

The following control is employed for causing a transition to the power save mode. In a first prior art, control is perform to automatically cause a transition to the power save mode when a prescribed time has elapsed from the last access. In a second prior art, working clients are examined by sending PING (Packet Internet Groper) packets, and the transition to the power save mode is controlled in accordance with the network condition (see Japanese Unexamined Patent Publication No. 2000-137550).

In the first prior art, the condition for transitioning to the power save mode is fixed, regardless of the external environment. That is, even when there are no working clients on the network, transition to the power save mode cannot be made until after a preset time has elapsed.

On the other hand, in the second prior art, while the network condition can be detected dynamically, and an optimum power save control can be performed based on the detected condition, the following problems remain to be solved.

(1) Wasteful packets flow through the network, resulting in increased traffic. If there are many printers on the network, and if the printers send PING packets to a large number of clients at predefined intervals of time, a considerable amount of traffic occurs.

(2) Sending a packet means providing some kind of information to other devices on the network. The amount of information contained in a PING packet is small, but since it at least has the function of telling other hosts that the sending device is working normally, the packet may affect other devices. In a simple example, when some other device is monitoring packets on the network to determine whether or not it should go into power save mode, there may arise the problem that the device cannot make a transition to the power save mode because of the PING packet.

(3) Since a response to the PING packet must be returned, it puts a burden on the receiving device.

SUMMARY OF THE INVENTION

The present invention has been devised in view of the above problems, and an object of the invention is to provide a printer, and a power save control method for the same, which can achieve efficient power save control by keeping track of the condition of each client of the printer without the printer having to send wasteful packets, that is, without affecting the network environment.

To achieve the above object, according to the present invention, there is provided a printer which supports a power save mode and performs printing by accepting a print request from a client via a network, comprising: packet monitoring means for monitoring packets flowing on the network, and for updating and storing a client-associated last receive time each time a packet is received from any client of the printer; printer usage rate computing means for determining, by referring to the client-associated last receive time stored by the packet monitoring means, that any client from whose associated last receive time has elapsed a prescribed time is in an idle condition, and for computing a printer usage rate by summing past average usage rates of clients that have been determined not to be in an idle condition; and time setting means for setting, based on the printer usage rate computed by the printer usage rate computing means, the length of time allowed before a transition is made to the power save mode.

In the printer having the above configuration, since the condition of each client on the network is monitored in real time, and since power save control is performed according to the condition being monitored, efficient power control can be achieved.

Preferably, according to the present invention, the printer further comprises means for forcing the printer to transition to a standby mode when the printer is in the power save mode and when the printer usage rate computed by the printer usage rate computing means is higher than a predetermined value.

Further preferably, according to the present invention, the time setting means determines the length of time allowed before the transition to the power save mode, by determining a power save interval according to the printer usage rate and subtracting an elapsed time in a mode other than the power save mode from the power save interval.

According to the present invention, there is also provided a power save control method for use by the above-described printer. Furthermore, according to the present invention, there is also provided a recording medium readable by the printer and having stored thereon a program for causing the printer to implement the above power save control method.

BRIEF DESCRIPTION OF THE DRAWINGS

Further features and advantages of the present invention will be apparent from the following description with reference to the accompanying drawings, in which.

DESCRIPTION OF THE EMBODIMENTS

An embodiment of the present invention will be described below with reference to the accompanying drawings. First, the principle on which the present invention is based will be described.

Every network device sends out a broadcast packet for communication, regularly (protocols such as NetBEUI) or irregularly (to resolve a MAC address using ARP before starting communication). By analyzing this broadcast packet and identifying the transmitting client, a list of working clients can be constructed.

Broadcast means sending a transmission simultaneously to all terminals attached to a LAN. Broadcast is often used for the transmission of control packets, for example, for address resolution performed prior to data communication. In TCP/IP, for example, ARP (Address Resolution Protocol) used to resolve a destination's MAC address from its IP address is one form of broadcast. Further, SAP (Service Advertising Protocol) used by NetWare to exchange server information also uses broadcast. Broadcast uses a specific address as the destination address. For example, in TCP/IP, the IP address 255.255.255.255 is used in the case of broadcast.

Furthermore, in a network constructed with a repeater hub, packets being communicated between two hosts can be intercepted by a third party. A list of working clients can be constructed by detecting source addresses from such packets.

Figure 2:
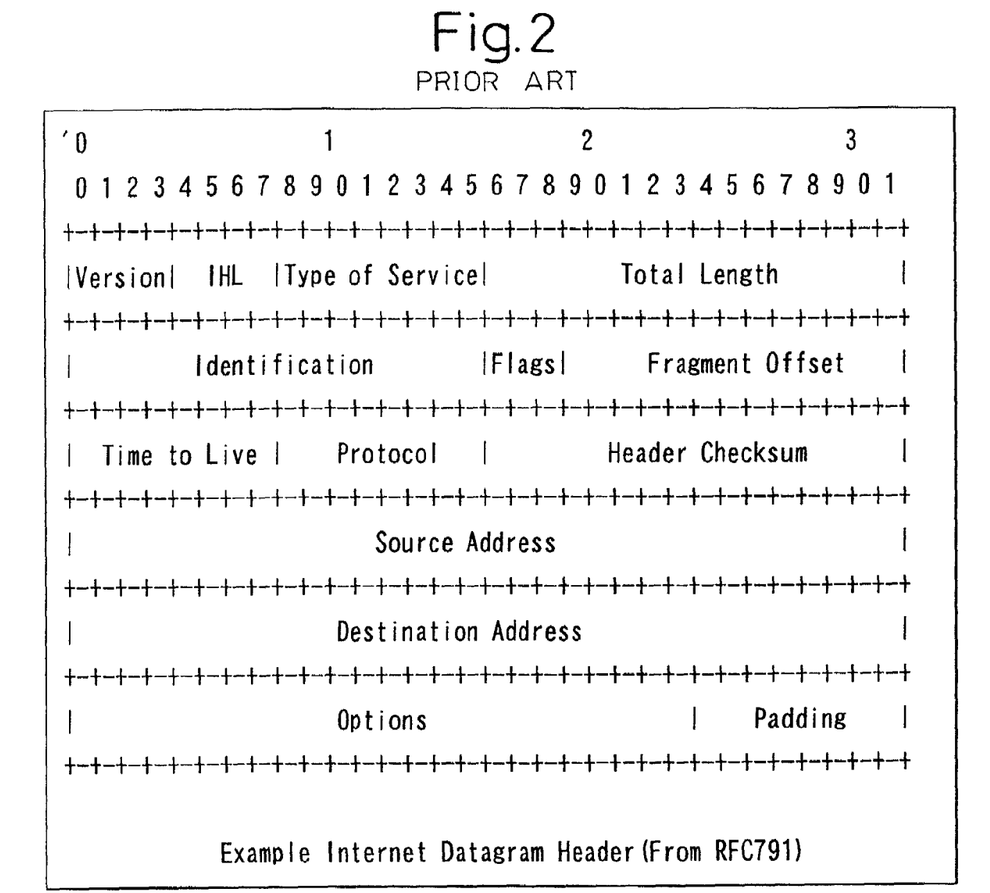
FIG. 2 is a diagram showing the format of an IP datagram header.

As an example, a means for identifying the source client address by analyzing an IP packet or an Ethernet packet will be described below. FIG. 2 is a diagram showing the format of an IP datagram header. In the case of broadcast, the destination address is 255.255.255.255 (FFFFFFFF), and the source address is the address of the transmitting client.

When such a packet reaches a printer, the printer can identify the source address by analyzing the IP header and create a list of clients working on the network.

Figure 3:
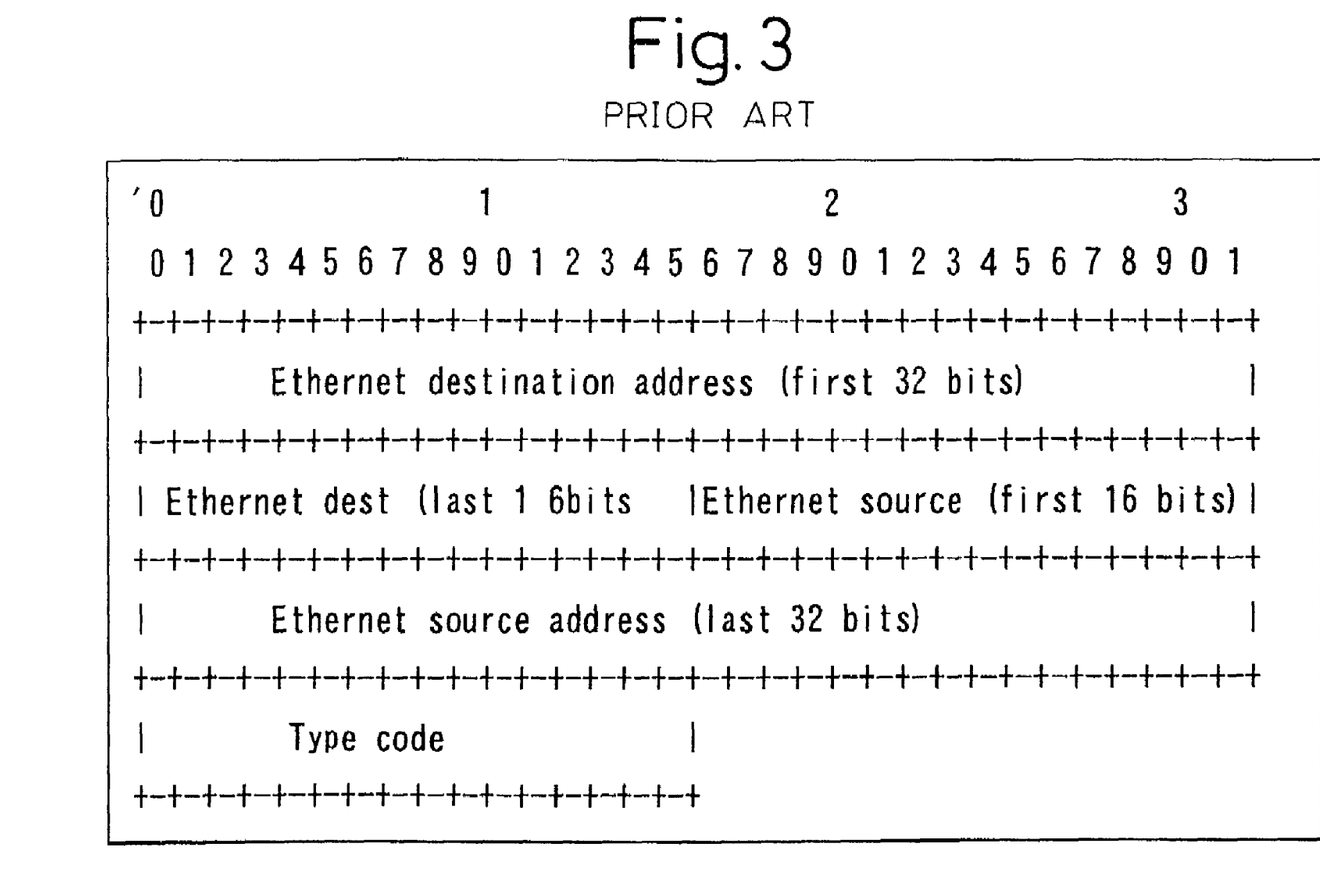
FIG. 3 is a diagram showing the format of an Ethernet packet header.

Likewise, the source can also be identified from the Ethernet packet header shown in FIG. 3. In this case, however, the host is indicated by a MAC address (Ethernet source), not by the IP address.

Figure 4:
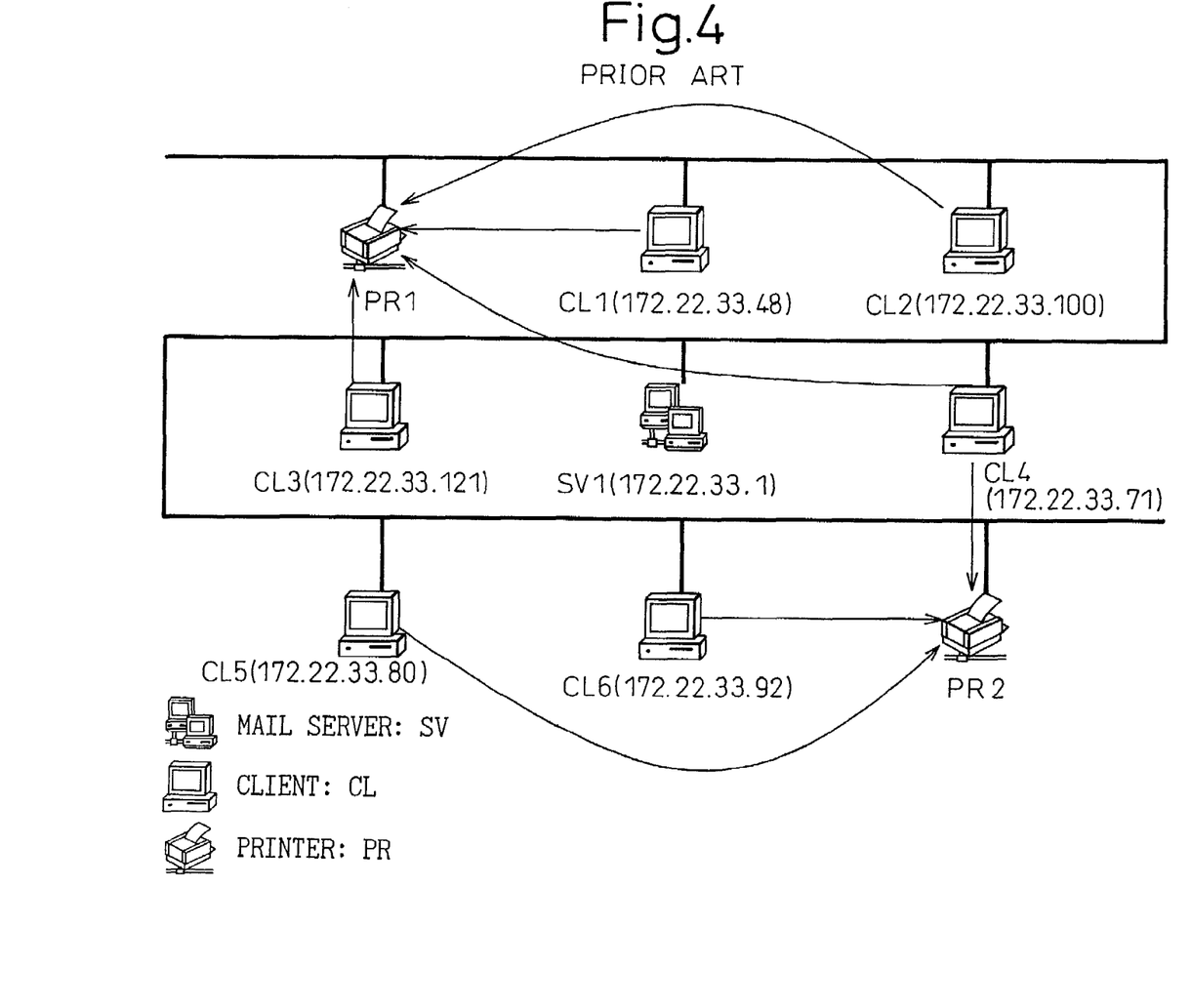
FIG. 4 is a diagram illustrating the configuration of a network to which is attached a printer according to one embodiment of the present invention.

Next, power save control for a printer will be described by taking an Ethernet network as an example. FIG. 4 is a diagram illustrating the configuration of a network to which is attached a printer according to one embodiment of the present invention. In the figure, PR1 and PR2 are printers directly attached to the network. CL1, CL2, CL3, CL4, CL5, and CL6 are clients, which request printing services directly from the printers. SV1 is a mail server.

Because of the limitation of the layout, etc., it is assumed here that each client uses the printer nearest to it. That is, CL1, CL2, and CL3 each use only PR1. CL5 and CL6 use only PR2. CL4, on the other hand, uses both PR1 and PR2. SV1 does not use any printers.

Figure 5:
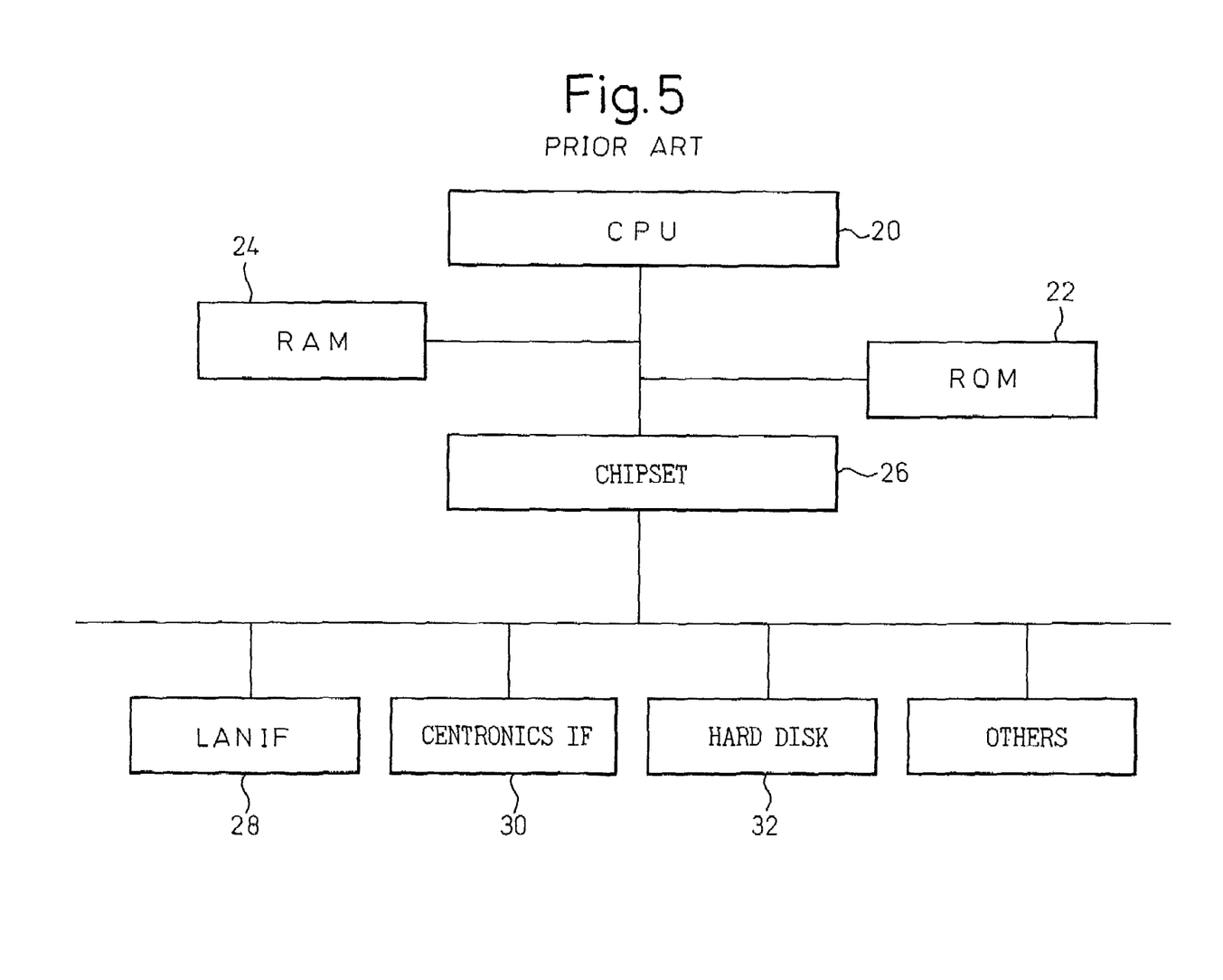
FIG. 5 is a diagram showing the hardware configuration of the printer.

FIG. 5 is a diagram showing the hardware configuration of each printer PR1, PR2. Firmware to be executed by a CPU 20 is stored in a ROM 22. When the printer is powered up, the CPU 20 executes the firmware stored in the ROM 22 either directly or after loading it into a RAM 24.

A chipset 26 is a set of LSIs which manages data transfers occurring between the CPU, memories, expansion boards, etc. A LAN IF unit 28 is a unit for interfacing with a LAN, and a Centronics IF unit 30 is a unit that supports the Centronics standard, a standard defining connections between personal computers and printers. The printer shown here is also equipped with a hard disk 32.

Figure 6:
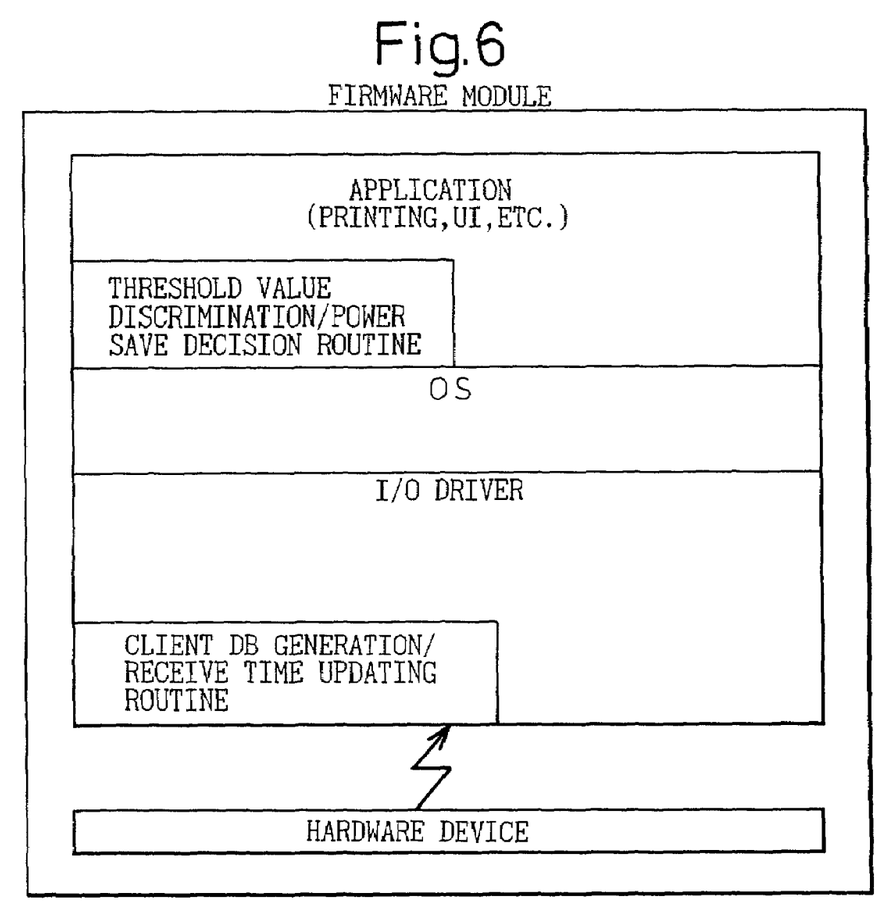
FIG. 6 is a diagram showing the configuration of a firmware module.

FIG. 6 is a diagram showing the configuration of a firmware module. As shown here, an application includes a threshold value discrimination/power save decision routine according to the present invention. An I/O driver includes a client DB generation/receive time updating routine according to the present invention.

Figure 7:
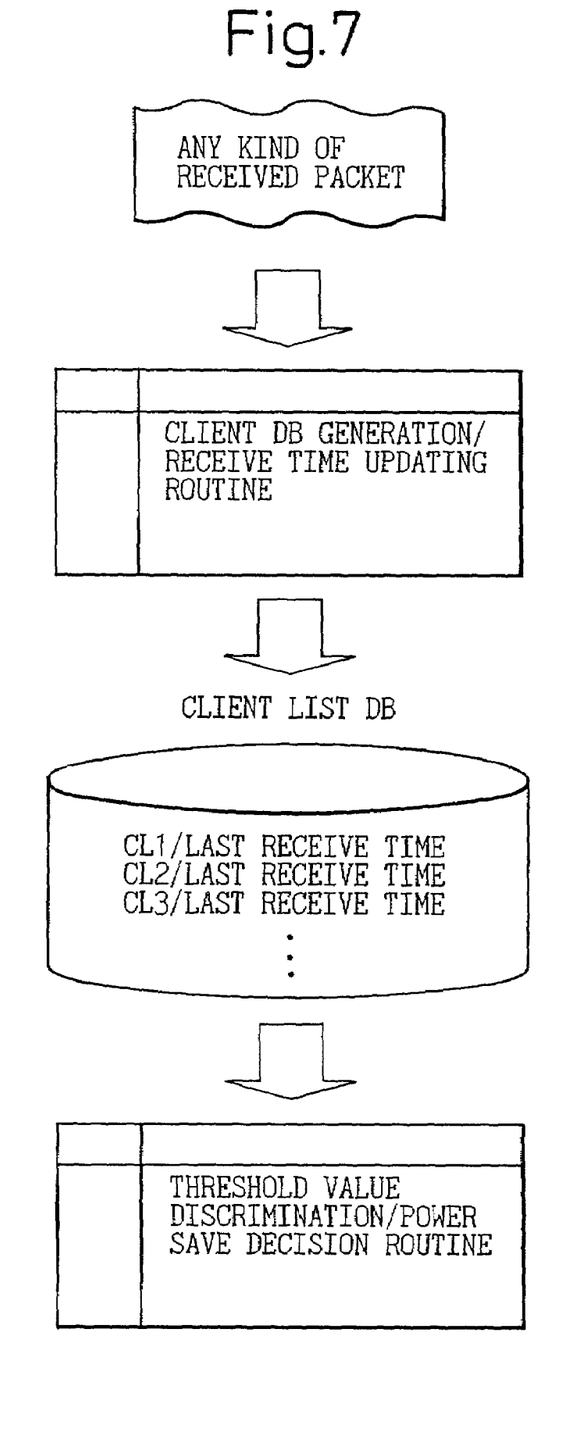
FIG. 7 is a diagram for explaining the relationship between a client DB generation/receive time updating routine and a threshold value discrimination/power save decision routine.

FIG. 7 is a diagram for explaining the relationship between the client DB generation/receive time updating routine and the threshold value discrimination/power save decision routine. The client DB generation/receive time updating routine receives any kind of packet as an input and generates, on the hard disk 32, a client list DB indicating the last receive time associated with each client and updates the generated client list DB. The threshold value discrimination/power save decision routine takes the client list DB as an input and performs power save control. These two routines are invoked by an operating system (OS), and information exchange between the routines is carried out on the client list DB.

Figure 8:
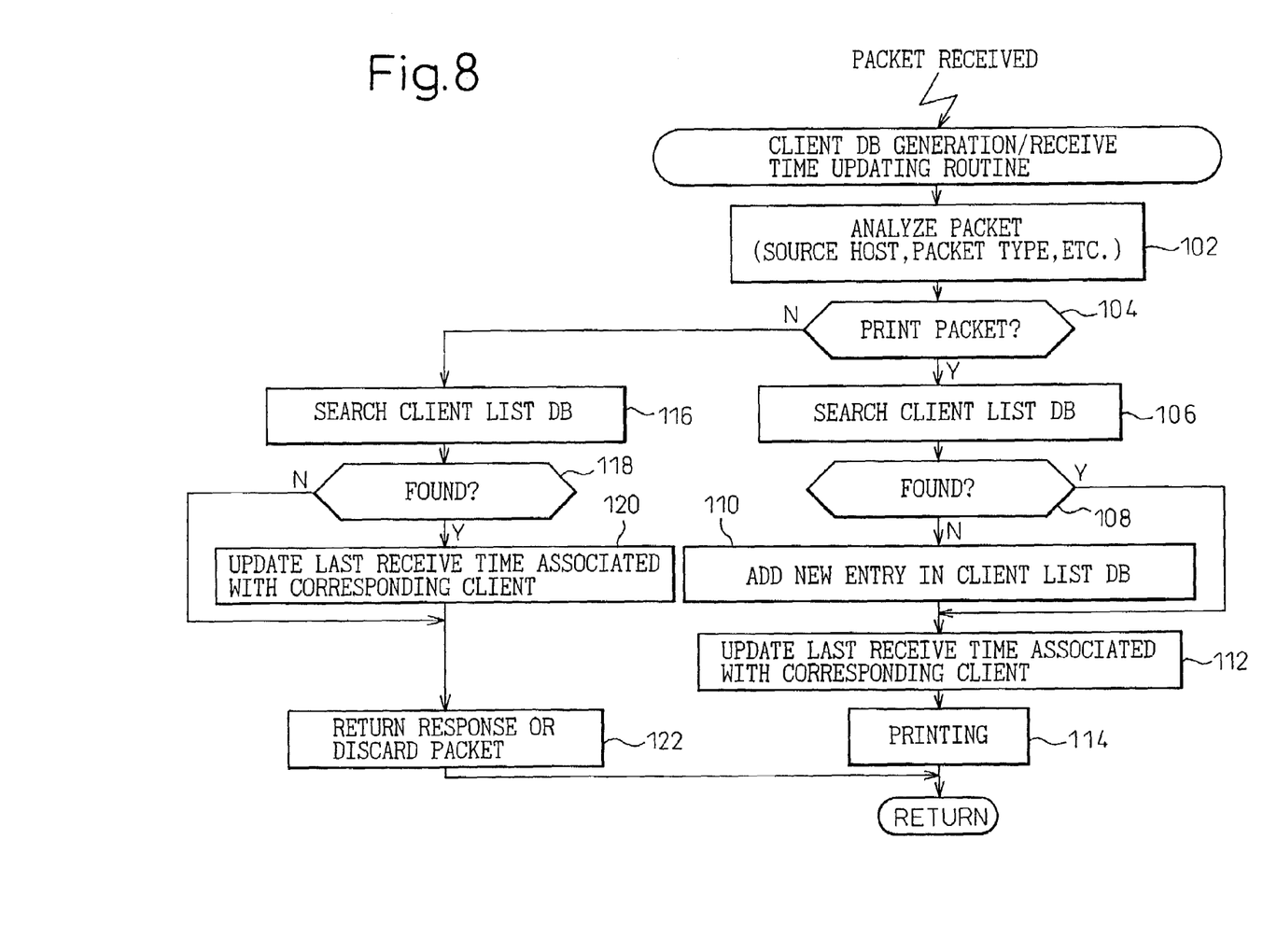
FIG. 8 is a flowchart illustrating a processing procedure for the client DB generation/receive time updating routine.

FIG. 8 is a flowchart illustrating a processing procedure for the client DB generation/receive time updating routine. This routine is invoked each time a packet is received. First, in step 102, the received packet is analyzed to identify the source host, packet type, etc. Next, in step 104, it is determined whether the received packet is a print packet or not, and if it is a print packet, the process proceeds to 106; otherwise, the process proceeds to step 116.

In step 106, a search is made through the client list DB on the hard disk 32. In step 108, it is determined whether the originator of the received packet is carried in the client list DB, and if it is found therein, the process proceeds to step 112. If it is not found, the process proceeds to step 110 where a new entry is added in the client list DB to register the new client of the printer, after which the process proceeds to step 112. In step 112, the receive time associated with the corresponding client is updated, and finally in step 114, printing is performed and the routine is terminated.

In step 116 also, which is carried out when it is determined in step 104 that the received packet is not a print packet, a search is made through the client list DB on the hard disk 32.

In the next step 118, it is determined whether the originator of the received packet is carried in the client list DB, and if it is not found therein, the process proceeds directly to step 122; on the other hand, if it is found, the receive time associated with the corresponding client is updated in step 120, after which the process proceeds to step 122. In step 122, a response is returned or the received packet is discarded, after which the routine is terminated.

Figure 9:
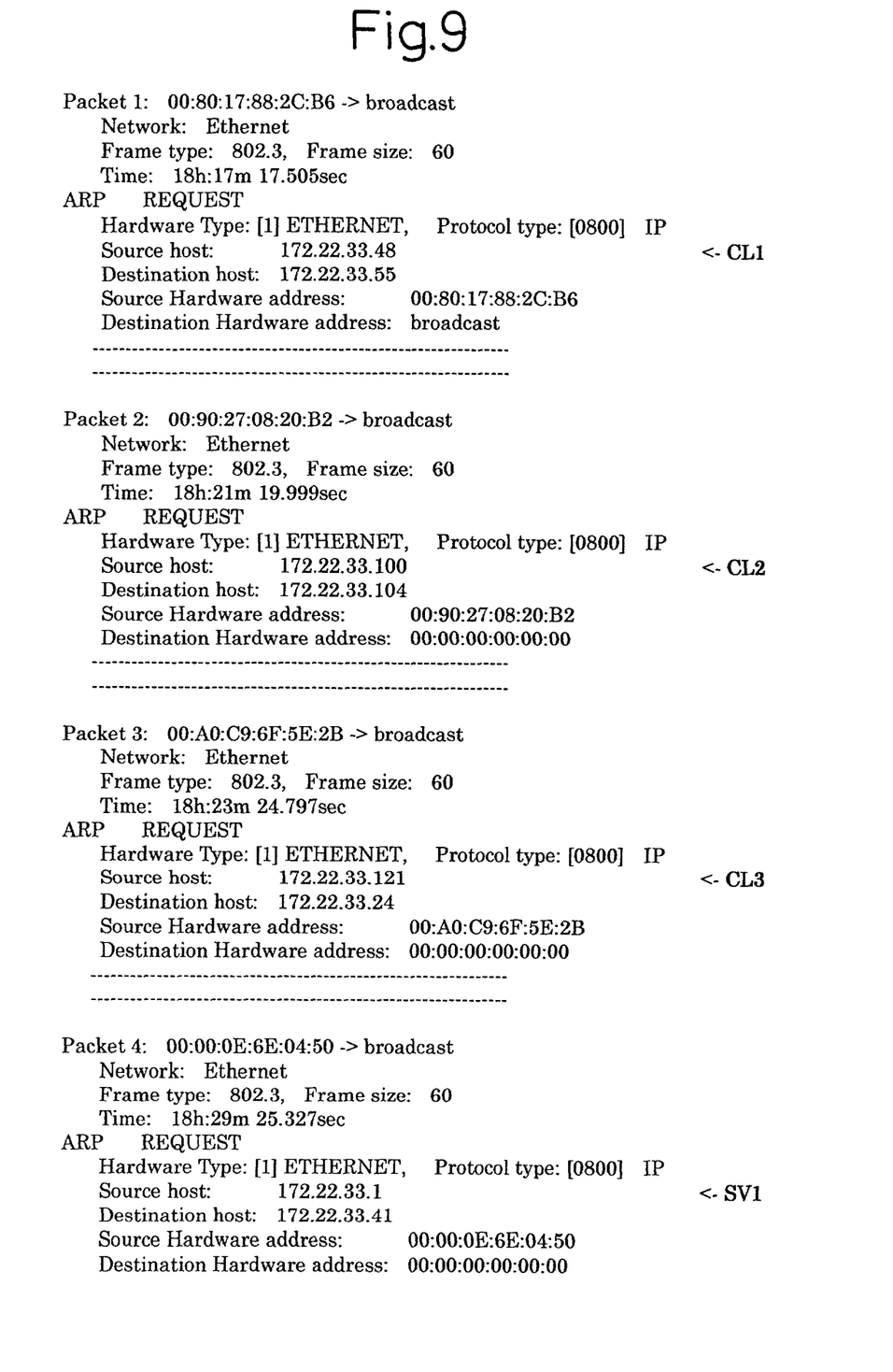
FIG. 9 is a diagram (part 1) showing examples of ARP packets that flow through the network during a certain time segment.
Figure 10:
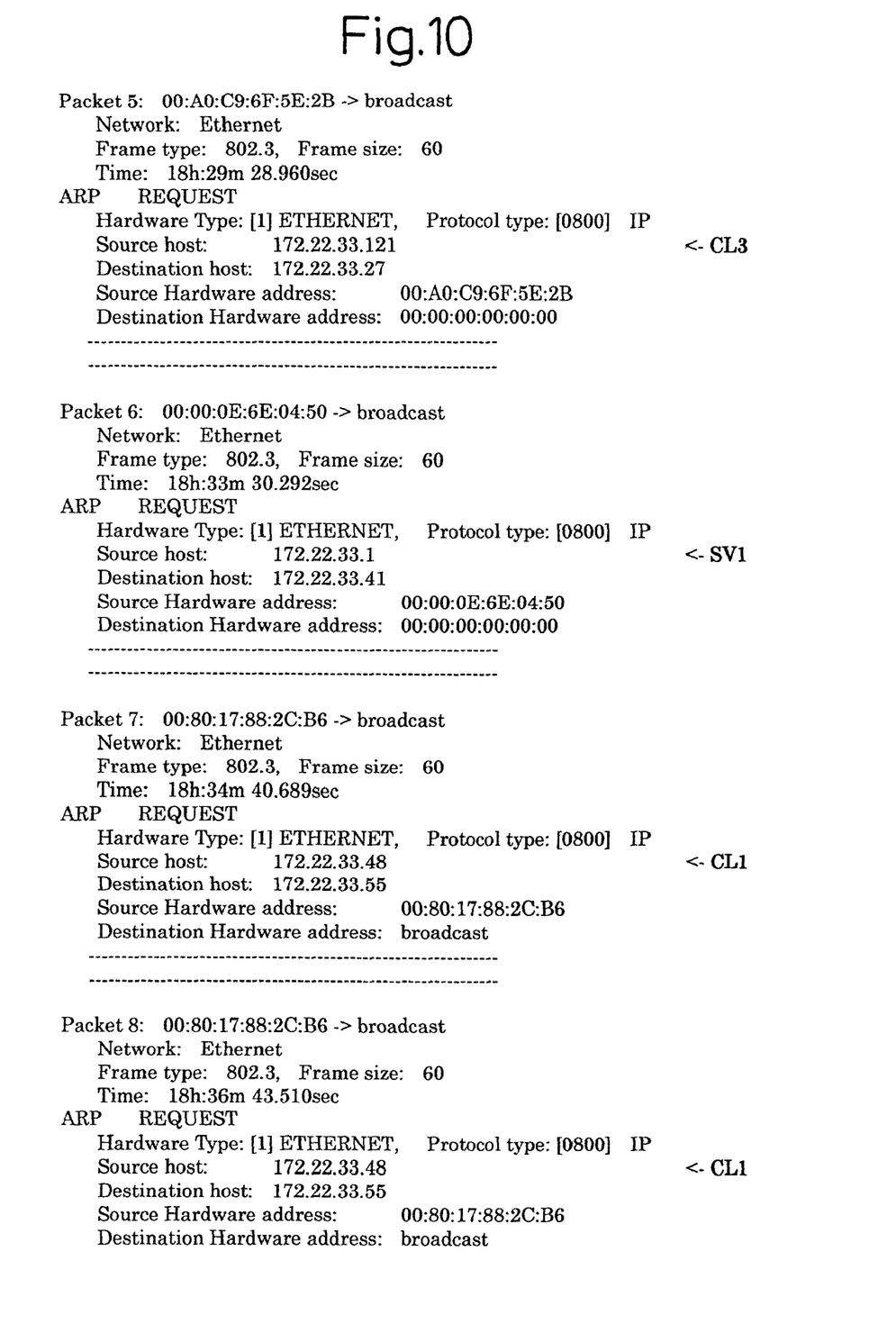
FIG. 10 is a diagram (part 2) showing examples of ARP packets that flow through the network during a certain time segment.
Figure 11:
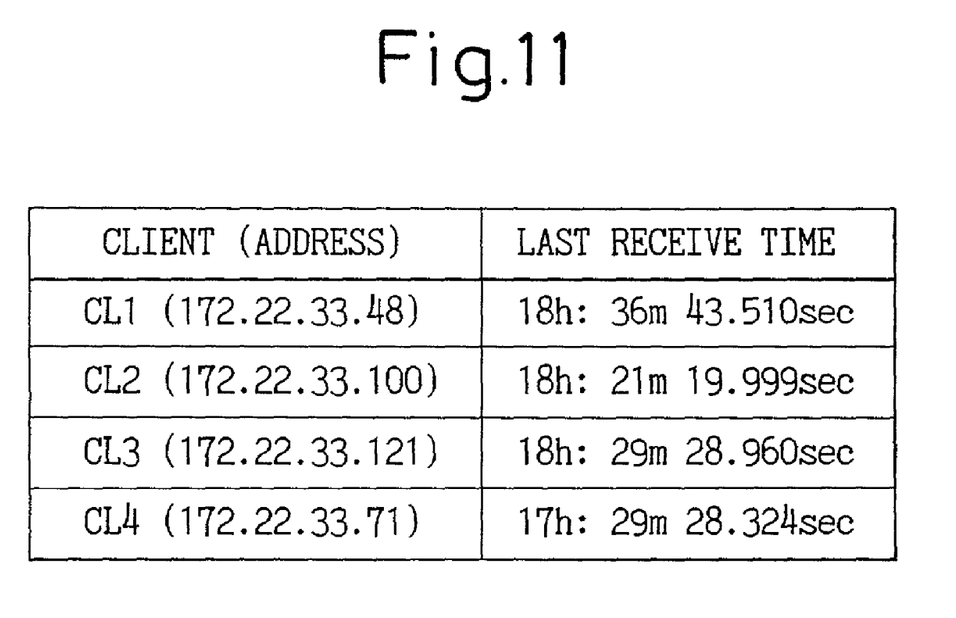
FIG. 11 is a diagram showing the contents of a client list DB by way of example.

FIGS. 9 and 10 show examples of ARP packets that flow through the network during a certain time segment; a total of eight packets are shown here. In this case, the client list DB in the printer PR1 is updated as shown in FIG. 11 by the function of the client DB generation/receive time updating routine, thus storing the last receive times associated with the respective clients using the printer PR1.

In the present invention, the last receive time stored in the client list DB is compared with the current time, and if no transmission is received for more than a predetermined length of time, then it is determined that the corresponding client is in an idle condition, and the current network condition is updated. If it is assumed here that the predetermined length of time, i.e., the threshold value, is 30 minutes and the current time is 18:40, then the client CL4 can be judged to be in an idle condition.

Figure 12:
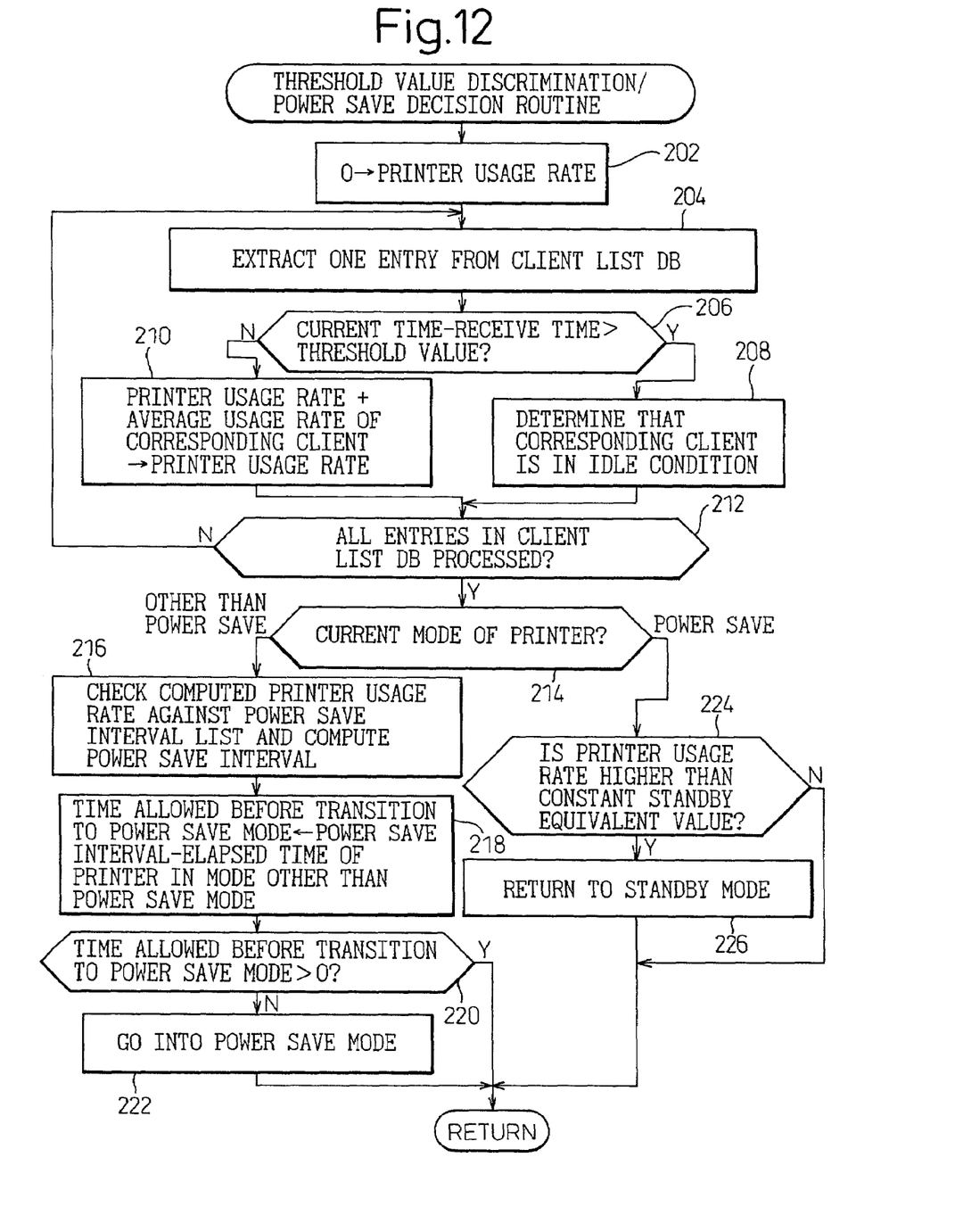
FIG. 12 is a flowchart illustrating a processing procedure for the threshold value discrimination/power save decision routine.

FIG. 12 is a flowchart illustrating a processing procedure for the threshold value discrimination/power save decision routine. This routine is invoked periodically by the operating system (OS) or a task control module. First, in step 202, the printer usage rate is initialized to 0. The unit of the printer usage rate is pages/hour. Next, in step 204, one entry is extracted from the client list DB on the hard disk 32.

Figure 13:
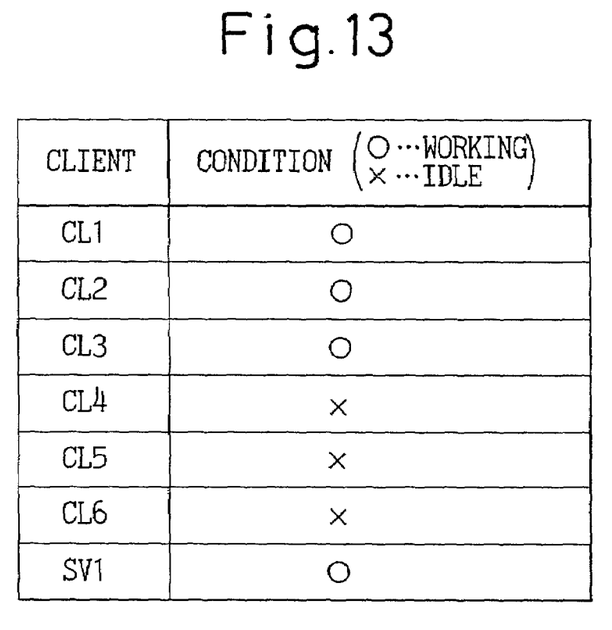
FIG. 13 is a diagram showing the condition of each client on the network.

Next, in step 206, for the extracted entry, it is determined whether the length of time from the last receive time to the current time exceeds a predetermined threshold value, and if it is determined that the length of time exceeds the threshold value, the process proceeds to step 208 to determine that the corresponding client is in an idle condition. Each printer PR1, PR2 makes this determination for its own clients; in the network of FIG. 4, when the packets flow as shown in FIGS. 9 and 10, the conditions of the respective clients on the network are as shown in FIG. 13.

Figure 14:
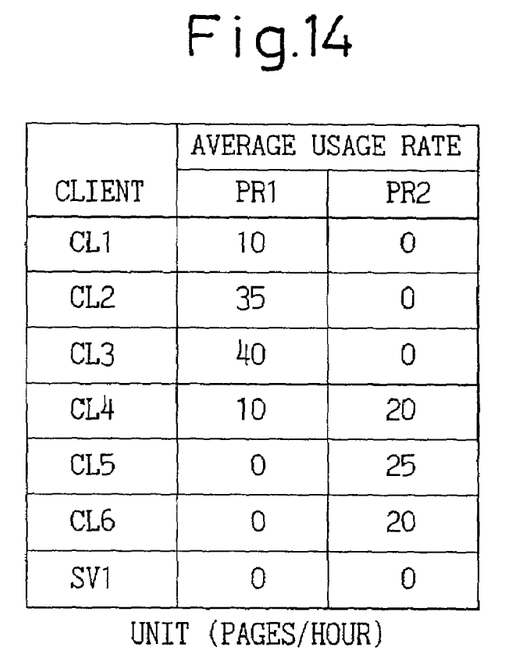
FIG. 14 is a diagram showing the average usage rates of respective clients that use respective printers.

On the other hand, if it is determined in step 206 that the length of time from the last receive time to the current time does not exceed the predetermined threshold value yet, the process proceeds to step 210 where the past average usage rate (expressed in pages/hour) of the corresponding client is added to the printer usage rate. For this computation, the average usage rate of each client of the printer is separately computed and stored in advance. FIG. 14 shows, by way of example, the average usage rates of the respective clients using the respective printers PR1 and PR2.

In step 212, which is carried out after step 208 or 210, it is determined whether all the entries in the client list DB have been processed and, if there is any entry remaining to be processed, the process loops back to step 204; on the other hand, if all the entries have been processed, the process proceeds to step 214. By the time that the process proceeds to step 214, the printer usage rate representing the sum of the average usage rates of the working clients has already been obtained.

In step 214, the current mode of the printer is checked, and if the printer is in the power save mode, the process proceeds to step 224; on the other hand, if it is in a mode other than the power save mode, the process proceeds to step 216. In this specification, modes other than the power save mode refer to the print mode, warmup mode, and standby mode shown in FIG. 1.

Figure 15:
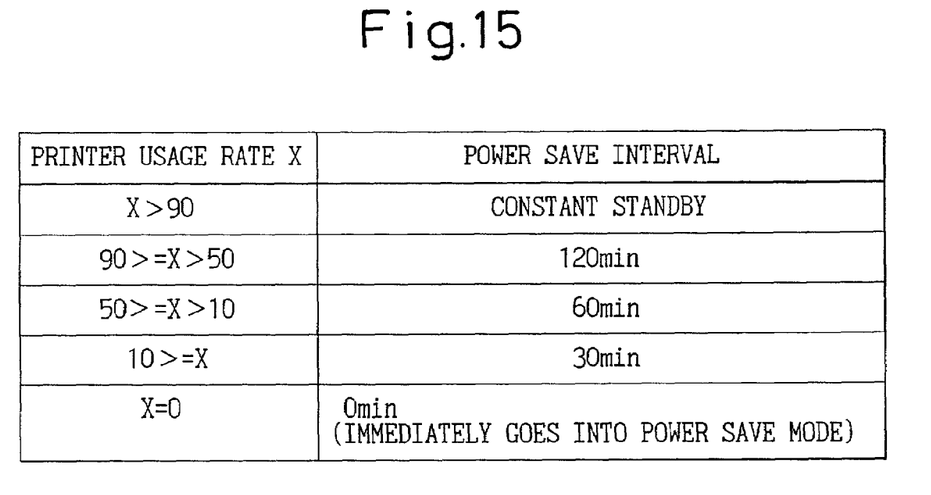
FIG. 15 is a diagram showing a power save interval list for determining a power save interval according to printer usage rate.

In step 216, the computed printer usage rate is checked against a power save interval list to determine power save interval. The power save interval list is a list in which the time interval between the moment that the printer exits the power save mode or that the printer last performs printing and the moment that the printer goes into the power save mode the next time is defined according to the condition of each network device, that is, each client. An example is shown in FIG. 15. The power save interval list is stored on the hard disk 32, and set to default values at the factory, but the user can change the values using an operation panel or a method specified by the manufacturer (using a special setting tool, TELNET, etc.).

For example, in the case of the printer PR1 which has CL1, CL2, CL3, and CL4 as its clients, if the respective clients are in the conditions shown in FIG. 13 and have the average usage rates shown in FIG. 14, since the printer usage rate X is calculated as $X$=Average usage rate of CL1+Average usage rate of CL2+Average usage rate of CL3=10+35+40=85 (pages/hour)

the power save interval is set to 120 minutes based on the power save interval list of FIG. 15.

Next, in step 218, the elapsed time in a mode other than the power save mode is subtracted from the thus determined power save interval, to obtain the time allowed starting from the current time before a transition is made to the power save mode. Then, in step 220, it is determined whether the time allowed before the transition to the power save mode is larger than 0, and if it is larger than 0, the routine is terminated; otherwise, the process proceeds to step 222 where the printer is put in the power save mode, after which the routine is terminated.

For example, in the case of the printer PR2 which has CL4, CL5, and CL6 as its clients, if the respective clients are in the conditions shown in FIG. 13 and have the average usage rates shown in FIG. 14, since none of the clients to be served is in a working condition, the printer usage rate is 0, and the power save interval is set to 0 minute based on the power save interval list of FIG. 15; as a result, the printer is immediately put in the power save mode.

In step 224, which is carried out when it is determined in step 214 that the current mode of the printer is the power save mode, it is determined, by referring to the power save interval list, whether the printer usage rate x is at such a large value (X>90) that the printer should be held in a constant standby mode. If X is not larger than the constant standby mode equivalent value (X≦90), the routine is terminated. On the other hand, if X is larger than the constant standby mode equivalent value (X>90), the process proceeds to step 226 where the printer is put in the standby mode, after which the routine is terminated.

According to the control described above, as the printer usage rate decreases, the printer tends to go into the power save mode more readily, thus achieving efficient power control.

Thus, the present invention provides a printer that controls power by keeping track of the condition of each client in real time, and a control method for the same. This offers the following effects.

(1) Since the network condition is timely checked, efficient power control of the printer becomes possible.

(2) The condition of each client can be detected by making use of any kind of packet flowing on the network.

(3) Since the printer does not issue wasteful packets, the above effects can be obtained without affecting the network environment and network devices.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A printer which supports a power save mode and performs printing by receiving a print request from a client via a network, comprising:
    a packet monitor that monitors a packet on the network, and updates and stores client-associated last received time by the client and data associating the client to the last received time, the client-associated last received time being the last time when the printer receives the packet for using the printer from the client;
    a printer usage rate computer that determines client condition based on the client-associated last received time, the client condition being idle condition when the packet is not received for a predetermined time, and computes a printer usage rate when the client condition is not the idle condition; and
    a time setting unit that sets the length of time to switch to the power save mode based on the printer usage rate.

2. The printer as claimed in claim 1, further comprising: a switching unit that switches the power save mode to a standby mode when the printer usage rate computed by the printer usage rate computer is higher than a predetermined value.

3. The printer as claimed in claim 1, wherein said time setting unit determines the length of time allowed before a transition to the power save mode, by determining a power save interval according to the printer usage rate and subtracting an elapsed time in a mode other than the power save mode from the power save interval.

4. A power save control method using for a printer, the printer for supporting a power save mode and performing print by receiving a print request from a client via a network, the method comprising:
    monitoring a packet on the network, and updating and storing client-associated last received time by the client and data associating the client to the last received time when the printer receives the packet for using the printer from the client, the client-associated last received time being the last time when the printer receives the packet for using the printer from the client;
    determining client condition based on the client-associated last received time, the client condition being idle condition when the packet is not received for a predetermined time, and
    computing a printer usage rate when the client condition is not the idle condition; and
    setting the length of time to switch to the power save mode based on the printer usage rate.

5. The power save control method as claimed in claim 4, further comprising: switching the power save mode to a standby mode when the printer usage rate is higher than a predetermined value.

6. The power save control method as claimed in claim 4, wherein a process of the setting further determines the length of time allowed before the transition to the power save mode, by determining a power save interval according to the printer usage rate and subtracting an elapsed time in a mode other than the power save mode from the power save interval.

7. A recording medium readable by a computer, the storage medium storing a program of instructions executable by the computer to perform a function for controlling a power save mode using for a printer, the printer for performing print by receiving a print request from a client via a network, the function comprising:
    monitoring a packet on the network, and updating and storing client-associated last received time by the client and data associating the client to the last received time when the printer receives the packet for using the printer from the client, the client-associated last received time being the last time when the printer receives the packet for using the printer from the client;
    determining client condition based on the client-associated last received time, the client condition being idle condition when the packet is not received for a predetermined time, and
    computing a printer usage rate when the client condition is not the idle condition; and
    setting the length of time to switch to the power save mode based on the printer usage rate.

8. The storage medium as claimed in claim 7, further comprising: switching the power save mode to a standby mode when the printer usage rate is higher than a predetermined value.

9. The storage medium as claimed in claim 7, wherein a process of the setting further determines the length of time allowed before the transition to the power save mode, by determining a power save interval according to the printer usage rate and subtracting an elapsed time in a mode other than the power save mode from the power save interval.

10. The printer as claimed in claim 1, further comprising:
    a list generator that generates a list of the clients which is working on the network when the packet is received by the printer.

* * * * *